March 17, 1959  J. L. MERRILL, JR  2,878,325
NEGATIVE IMPEDANCE REPEATERS
Filed April 15, 1954  3 Sheets-Sheet 1
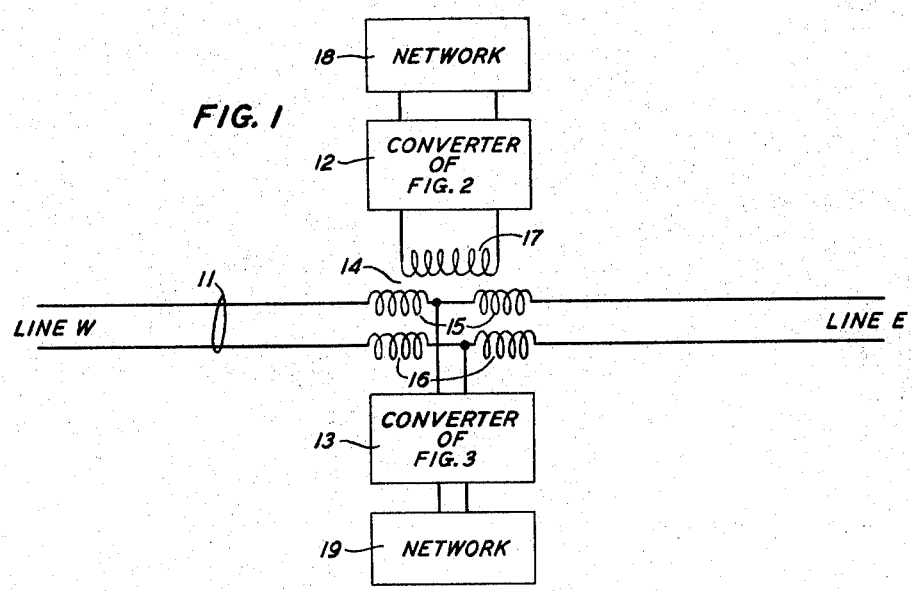
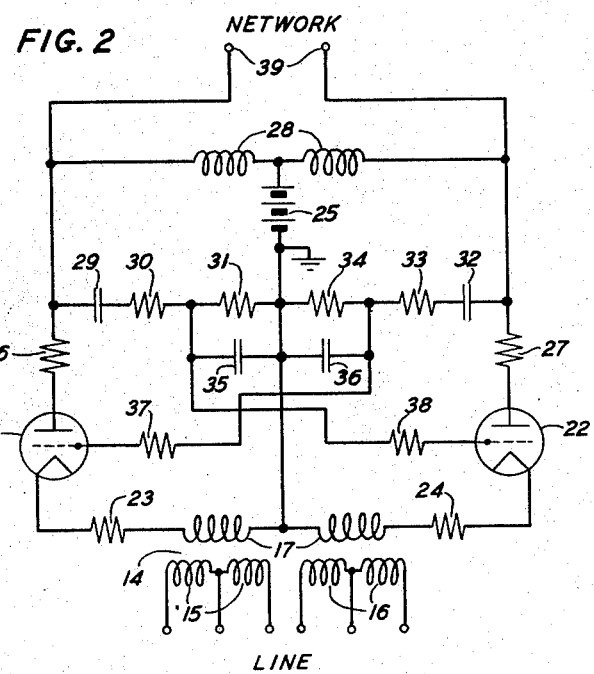
INVENTOR
J. L. MERRILL, JR.
BY
R. B. Ardis
ATTORNEY March 17, 1959     J. L. MERRILL, JR     2,878,325
NEGATIVE IMPEDANCE REPEATERS
Filed April 15, 1954     3 Sheets-Sheet 2

INVENTOR
J. L. MERRILL, JR.
BY R. B. Ardis
ATTORNEY

March 17, 1959  J. L. MERRILL, JR  2,878,325
NEGATIVE IMPEDANCE REPEATERS
Filed April 15, 1954  3 Sheets-Sheet 3

INVENTOR
J. L. MERRILL, JR.
BY
R. B. Ardis
ATTORNEY

United States Patent Office 2,878,325
Patented Mar. 17, 1959

2,878,325

NEGATIVE IMPEDANCE REPEATERS

Josiah L. Merrill, Jr., Port Washington, N. Y., assignor to Bell Telephone Laboratories, Incorporated, New York, N. Y., a corporation of New York Application April 15, 1954, Serial No. 423,348

10 Claims. (Cl. 179—170)

This invention relates generally to negative impedance repeaters and more particularly, although in its broader aspects not exclusively, to negative impedance repeaters employing negative impedances of both the series and the shunt type.

A principal object of the invention is to stabilize negative impedance repeaters against self-oscillation.

Another and more particular object is to provide stable negative impedance repeaters capable of reducing the loss of a transmission line below the level realized through the use of negative impedance repeaters known in the prior art.

Still another object is to provide stable negative impedance repeaters which are capable both of effecting an impedance transformation and of reducing the transmission line loss below the level made possible through the use of previously existing negative impedance repeaters.

As outlined by George Crisson in his article on "Negative impedances and the twin 21-type repeater," appearing at page 485 of the July 1931, issue of the Bell System Technical Journal, negative impedances may be classified in two categories. The first of these includes negative impedances of the series or reversed-voltage type. Such negative impedances are open-circuit stable and can, in general, be connected in series with a transmission line to produce amplification without rendering the line self-oscillatory. The second group includes negative impedances of the shunt or reversed-current type. Such negative impedances are short-circuit stable and can, in general, be connected in shunt across a transmission line without rendering the line self-oscillatory. One or more negative impedances of each type may be associated with each other to reduce the loss of a transmission line below the level which would be made possible through the use of a negative impedance of one type alone.

Two of the best circuits for producing negative impedances of the series and shunt type form the basis for the present inventor's application Serial No. 191,670, filed October 23, 1950 (issued April 17, 1956, as United States Patent 2,742,616), and for application Serial No. 417,650, filed March 22, 1954, by S. T. Meyers (issued December 24, 1957, as United States Patent 2,817,822), respectively. Both of these applications illustrate four-terminal negative impedance converters which, when an impedance Z is connected across one pair of terminals, present an impedance of substantially $-kZ$ at another pair of terminals and, when an impedance Z is connected across the other pair of terminals, present an impedance of substantially $$\frac{Z}{-k}$$

at the first pair of terminals. In these impedance expressions, $-kZ$ represents a negative impedance of the series type $$\frac{Z}{-k}$$

represents a negative impedance of the shunt type, and $k$ is substantially a real number over a prescribed operating frequency range. These converters will be described in more detail later.

When the type of converters described above are connected to produce a negative impedance of the series type in series and a negative impedance of the shunt type in shunt across a transmission line, either seperately or in combination with one another, neither the transmission line nor the converters generally become self-oscillatory within the signal frequency band. The manner in which the negative impedances are coupled to the transmission line does not, however, guarantee that the negative impedance converters themselves will be stable at frequencies outside the frequency band of signal transmission. If such self-oscillations are generated, they can overload the amplifier components of the negative impedance converters and cause them to operate on non-linear portions of their characteristics. Distortion would thus be introduced in the signal transmission band of the transmission line even though the actual oscillations generated by the converters are entirely outside of it in frequency.

The present invention permits negative impedance converters to be stabilized against self-oscillation at frequencies outside of as well as within the prescribed signal frequency band and distortion within the signal band caused by such self-oscillations to be avoided. In accordance with a principal feature of the invention, a four-terminal negative impedance converter of the type presenting a negative impedance of the shunt type at one pair of terminals and a negative impedance of the series type at the other is provided with a two-terminal terminating network which presents either substantially an open-circuit or substantially a short-circuit to the converter at frequencies outside of the prescribed signal band. A converter connected to provide a negative impedance of the shunt type across the line is provided with a terminating network which presents to the converter substantially an open-circuit at frequencies above and below the signal band, while a converter connected to provide a negative impedance of the series type in series with the line is provided with a terminating network which presents to the converter substantially a short-circuit at frequencies above and below the signal band.

One principal embodiment of the invention takes the form of a bridged-T type negative impedance repeater in which a first negative impedance converter, oriented to produce a negative impedance of the series type in series with a two-wire transmission line, is coupled to the line by a transformer having a winding connected in series with at least one side of the line and a second negative impedance converter, oriented to produce a negative impedance of the shunt type in shunt across the line, is connected between an intermediate point of the line winding of the transformer and the other side of the line. The first converter is stabilized against self-oscillation by a terminating network presenting substantially a short-circuit at frequencies outside of the signal band and the second converter is stabilized against self-oscillation by a terminating network presenting substantially an open-circuit at frequencies outside of the signal band. Such a repeater is capable of reducing the loss of the transmission line well below the level reached through the use of only a single negative impedance converter but is not subject to signal frequency distortion caused by converter self-oscillation.

Another principal embodiment of the invention takes the form of an L-type negative impedance repeater which is generally similar to the embodiment described above except that the second converter is connected between one end of the line winding of the transformer and the other side of the line. This repeater is also able to reduce line loss below the level made possible by only the use of a single converter without introducing distortion within the signal band. In addition, it provides an impedance transformation which is often highly desirable in coupling from a relatively high impedance line (e. g., a coil-loaded line) to a relatively low impedance line (e. g., a non-loaded line).

A more complete understanding of the present invention and the principles underlying it may be obtained from a study of the following detailed description of several specific embodiments. In the drawings:

Fig. 1 is a block diagram of a T-type negative impedance repeater embodying the present invention;

Fig. 2 is a detailed drawing of a negative impedance converter particularly suitable for providing a negative impedance of the series type;

Figure 3:
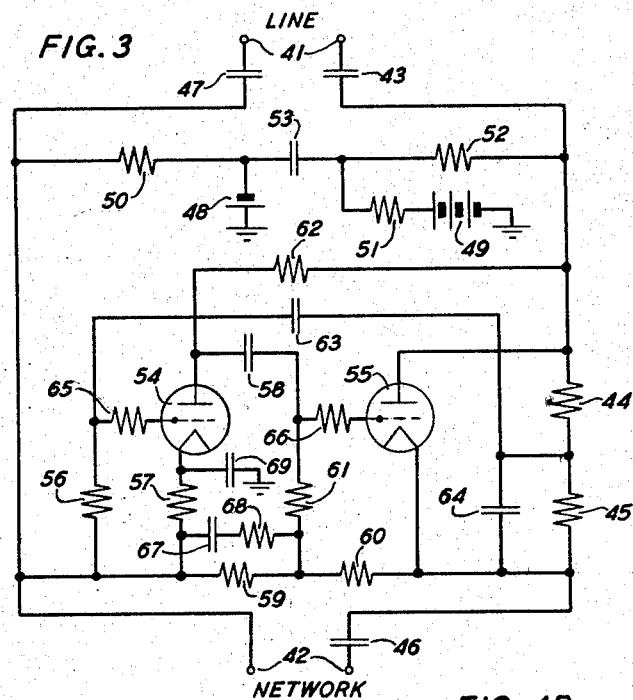
Fig. 3 is a similar drawing of a negative impedance converter particularly suitable for providing a negative impedance of the shunt type.

The embodiment of the invention shown in Fig. 1 is a T-type negative impedance repeater in which a negative impedance of the series or reversed-voltage type is coupled in series with the line and a negative impedance of the shunt or reversed-current type is connected in shunt across the line. A two-wire transmission line 11 having a prescribed frequency band of signal transmission is provided with these negative impedances by a pair of four-terminal negative impedance converters 12 and 13. Both of these converters, which will be described in more detail later, are of the type which present to the line a negative impedance of the series type when one pair of terminals is terminated in a passive impedance network and a negative impedance of the shunt type when the other pair of terminals is so terminated. Converter 12 is coupled to the line through a transformer 14 having a split line winding providing two equal windings 15 and 16 in a balanced series connection with the line. Both halves of the line winding are provided with center taps for connection to converter 13. The converter winding 17 of transformer 14 is an integral part of converter 12.

In the arrangement illustrated in Fig. 1, converter 12 is terminated in a suitable two-terminal network 18 and presents a negative impedance of the series type to line 11 which, over the signal frequency band, is substantially a negative multiple of the positive impedance presented to converter 12 by network 18. Converter 13 is terminated in another two-terminal network 19 and presents a negative impedance of the shunt type to line 11 which, over the signal frequency band, is substantially a negative multiple of the positive impedance presented to converter 13 by network 19. The repeater made up of negative impedance converters 12 and 13 and their associated elements provides an increase in gain beyond that available through the use of only a single converter but does not have any adverse effect upon the stability of transmission line 11.

In accordance with a principal feature of the present invention, the negative impedance repeater shown in Fig. 1 is stabilized against self-oscillation outside of as well as within the signal frequency band within converters 12 and 13. Overloading of the amplifier components of converters 12 and 13 is thereby avoided, and the amplifiers do not depart from linear operation in the signal band. While negative impedance converters 12 and 13 are open-circuit stable and short-circuit stable, respectively, as they appear from transmission line 11, the situation is reversed as they appear from terminating networks 18 and 19. Converter 12 is short-circuit stable as seen from network 18 and converter 13 is open-circuit stable as seen from network 19. In accordance with the present invention, therefore, network 18 is selected to present to converter 12 substantially a short-circuit at frequencies above and below the signal band, and network 19 is selected to present to converter 13 substantially an open-circuit at frequencies above and below the signal band. This is accomplished at these frequencies by making the impedance of network 18 very small with respect to the impedance of the line and by making that of network 19 very large with respect to that of the line. Actual short- and open-circuits may, in general, be realized only at frequencies of zero and infinity, but, as a practical matter, they are approached as a limit at other frequencies outside of the signal band.

The two-terminal transmission line 11 in Fig. 1 may, by way of example, be either a non-loaded line or a coil-loaded line. In general, the two-terminal impedance networks chosen for terminating networks 18 and 19 are different for use in connection with different types of lines. The principles underlying the present invention are applicable, however, regardless of the type of line involved, and negative impedance repeaters embodying the invention are stable against converter self-oscillation.

A four-terminal negative impedance converter particularly suitable for use as converter 12 in the embodiment of the invention shown in Fig. 1 is illustrated schematically in Fig. 2. This converter forms the basis for the present applicant's copending application noted above. It includes a pair of push-pull connected triode vacuum tubes 21 and 22 which may, if desired, be included within a single envelope. The cathodes of tubes 21 and 22 are connected to opposite sides of winding 17 of transformer 14 through respective negative feedback resistances 23 and 24, and their anodes are connected to the positive side of a direct voltage source 25 through respective anode resistances 26 and 27 and respective halves of an inductance coil 28. The negative side of direct voltage source 25 is grounded and connected to the midpoint of transformer winding 17. Cross-coupling between the respective anodes and grids of tubes 21 and 22 is accomplished by a number of circuit elements. A path to ground from the junction between resistance 26 and coil 28 is provided by the series combination of a capacitor 29 and a pair of resistances 30 and 31. A like path to ground from the junction between resistance 27 and coil 28 is provided by the series combination of a capacitor 32 and a pair of resistances 33 and 34. Resistances 31 and 34 are shunted by a pair of capacitors 35 and 36, respectively. The grid of tube 21 is connected through a resistance 37 to the junction of resistances 33 and 34, while that of tube 22 is connected through a resistance 38 to the junction of resistances 30 and 31.

Although the negative impedance converter shown in Fig. 2 is capable of producing either a negative impedance of the series type or one of the shunt type, the terminal orientation illustrated is for a presentation to the line of a negative impedance of the series type. The "line" terminals are those illustrated in Fig. 1 and are provided by the split line winding of transformer 14. Windings 15 and 16 are for connection in series with the respective sides of the transmission line and are provided with center taps for connection to the shunt type of negative impedance provided by converter 13. The "network" windings 39 in Fig. 2 are connected to respectively opposite sides of inductance coil 28.

For details concerning the operation of the four-terminal negative impedance converter shown in Fig. 2, reference is made to the present inventor's above-identified copending application. The following values for the circuit elements making up the converter are given by way of example:

| | |
|---|---|
| Winding 15 | 18 ohms. |
| Winding 16 | 18 ohms. |
| Winding 17 (each half) | 250 ohms. |
| Tube 21 | } Western Electric 407A. |
| Tube 22 | |
| Resistance 23 | 100 ohms. |
| Resistance 24 | 82 ohms. |
| Voltage 25 | 130 volts. |
| Resistance 26 | 510 ohms. |
| Resistance 27 | 510 ohms. |
| Coil 28 (each half) | 285 ohms. |
| Condenser 29 | 0.25 microfarad. |
| Resistance 30 | 5600 ohms. |
| Resistance 31 | 150,000 ohms. |
| Condenser 32 | 0.25 microfarad. |
| Resistance 33 | 5600 ohms. |
| Resistance 34 | 150,000 ohms. |
| Condenser 35 | 500 micromicrofarads. |
| Condenser 36 | 500 micromicrofarads. |
| Resistance 37 | 33,000 ohms. |
| Resistance 38 | 33,000 ohms. |

A four-terminal negative impedance converter particularly suitable for use as converter 13 in the embodiment of the invention shown in Fig. 1 is illustrated in detail in Fig. 3. This converter forms the basis for the above-identified copending application of S. T. Meyers. It includes a pair of "line" terminals 41 and a pair of "network" terminals 42. A series path between one of the "line" terminals 41 and one of the "network" terminals 42 is provided by a coupling condenser 43, a resistance 44, a resistance 45, and a coupling condenser 46. A coupling condenser 47 is connected between the remaining "line" and "network" terminals to provide a path between them. Direct operating potentials are supplied to the converter illustrated in Fig. 3 by a pair of direct potential sources 48 and 49. Potential source 48, which supplies a small negative potential, has its positive side grounded and its negative side connected through a resistance 50 to the side of coupling condenser 47 remote from the "line" terminal to which it is connected. Potential source 49, which supplies a larger positive potential, has its negative side grounded and its positive side connected through the series combination of a pair of resistances 51 and 52 to the junction between resistance 44 and coupling condenser 43. For filtering purposes, a condenser 53 is connected from the negative side of potential source 48 to the junction between resistances 51 and 52.

The amplifier in the negative impedance converter shown in Fig. 3 is a two-stage single-sided amplifier composed of a pair of triode vacuum tubes 54 and 55. These tubes, too, may, if desired, be within a single envelope. The grid of the first tube 54 is connected to the junction between coupling condenser 47 and resistance 50 through the series combination of a small grid resistance 65 and a large grid resistance 56, while the cathode of the same tube is connected to the same point through a smaller cathode resistance 57. The anode of tube 54 is connected to the grid of the second tube 55 through the series combination of a coupling condenser 58 and a small grid resistance 66. A resistance 59 and a negative feedback resistance 60 are connected in series from the junction between resistances 56 and 57 to that between resistance 45 and condenser 46. Resistance 59 is shunted by the series combination of a condenser 67 and a resistance 68. The grid of tube 55 is returned to the junction between resistances 59 and 60 through a large grid resistance 61, while the cathode of tube 54 is returned to ground through a balancing condenser 69.

The cathode of tube 55 is connected to the junction between resistances 45 and 60, while the anode of the same tube is connected to the junction between resistances 44 and 52. A resistance 62 is coupled between the anode of tube 54 and the anode of tube 55. A coupling condenser 63 is connected between the grid of tube 54 and the junction between resistances 44 and 45, while a condenser 64 is returned from that point to the junction between resistances 45 and 60.

The four-terminal negative impedance converter illustrated in Fig. 3 is similar to that shown in Fig. 2 in that it is capable of producing either a negative impedance of the series type or one of the shunt type. Here, however, the terminal orientation is such that the negative impedance presented to the line is of the shunt or reversed-current type. The "line" windings 41 are connected to opposite sides of the line in the manner shown in Fig. 1.

For details concerning the operation of the negative impedance converter described in connection with Fig. 3, reference is made to the above-identified application of S. T. Meyers. The following values for the circuit elements of the converter are given by way of example:

| | |
|---|---|
| Condenser 43 | 1 microfarad. |
| Resistance 44 | 84,500 ohms. |
| Resistance 45 | 100,000 ohms. |
| Condenser 46 | 0.5 microfarad. |
| Condenser 47 | 1 microfarad. |
| Voltage 48 | −24 volts. |
| Voltage 49 | +130 volts. |
| Resistance 50 | 3010 ohms. |
| Resistance 51 | 1000 ohms. |
| Resistance 52 | 3010 ohms. |
| Condenser 53 | 20 microfarads. |
| Tube 54 | } Western Electric 407A. |
| Tube 55 | |
| Resistance 56 | 1 megohm. |
| Resistance 57 | 681 ohms. |
| Condenser 58 | 0.1 microfarad. |
| Resistance 59 | 5000 ohms. |
| Resistance 60 | 221 ohms. |
| Resistance 61 | 1 megohm. |
| Resistance 62 | 33,200 ohms. |
| Condenser 63 | 0.022 microfarad. |
| Condenser 64 | 47 micromicrofarads. |
| Resistance 65 | 470 ohms. |
| Resistance 66 | 470 ohms. |
| Condenser 67 | 0.027 microfarad. |
| Resistance 68 | 24,900 ohms. |
| Condenser 69 | 270 micromicrofarads. |

As has already been pointed out, the present invention permits negative impedance converters of the type shown in Figs. 2 and 3 to be operated without danger of converter instability due to self-oscillation outside the frequency band of interest. In accordance with a first feature of the invention, the converter connected in shunt across transmission line 11 in Fig. 1 is provided with a terminating impedance or network which presents to the converter substantially an open-circuit (i. e., a relatively high impedance) at frequencies above and below the prescribed signal frequency band. In accordance with a second feature of the invention, the converter connected in series with the line is provided with a terminating impedance which presents to the converter substantially a short-circuit (i. e., a relatively low impedance) at frequencies above and below the signal band.

Figure 4A:
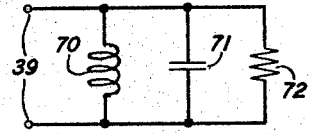
Figs. 4A through 4F illustrate terminating circuits which, in accordance with a feature of the present invention, may be used to stabilize the converter of Fig. 2 against self-oscillation outside of the signal frequency band.
Figure 4B:
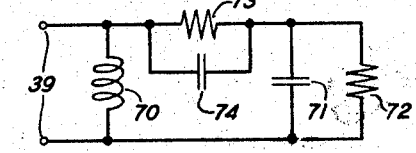

Figs. 4A and 4B illustrate schematically a pair of two-terminal passive impedance networks which would be suitable for terminating an ideal four-terminal negative impedance converter connected to produce a series type negative impedance in series with a non-loaded transmission line. In Fig. 4A, an inductance 70, a capacitance 71, and a resistance 72 are connected in parallel with each other between the network terminals which are labelled 39 to correspond with "network" terminals 39 of the negative impedance converter in Fig. 2. In Fig. 4B, inductance 70, capacitance 71, and resistance 72 are the same as in Fig. 4A, but the parallel combination of a resistance 73 and a small capacitance 74 is connected between one side of inductance 70 and the corresponding side of capacitance 71 in order to give additional control over the high frequency impedance characteristic of the network.

The terminating networks shown in Figs. 4A and 4B, in accordance with a feature of the invention, present to terminals 39 an impedance which is very low with respect to the line impedance at frequencies above and below the signal band wherein inductance 70 and capacitance 71 resonate. Inductance 70 represents substantially a short-circuit at low frequencies, while capacitance 71 represents substantially a short-circuit at high frequencies. Since the converter as seen from its "network" terminals is short-circuit stable, it is thereby prevented from becoming self-oscillatory outside of the signal band. Stability within the signal band is controlled by the relationship between the line impedance and network impedance. The closer in both magnitude and shape these are to each other, the greater is the gain and the nearer to instability is the repeater.

Figure 4C:
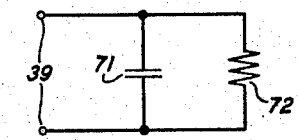
Figure 4D:
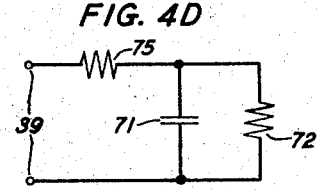

Figs. 4C and 4D show a pair of two-terminal passive impedance networks which may be used for terminating the actual negative impedance converter illustrated in Fig. 2 when the converter is connected to produce a series type negative impedance in series with a non-loaded line. In Fig. 4C, a capacitance 71 is connected in parallel with a resistance 72 between network terminals 39, while in Fig. 4D, the network is the same except that a small resistance 75 is connected between one of the network terminals and the parallel combination.

The negative impedance converter illustrated in Fig. 2 has, it will be noted, an inductance coil 28 connected across "network" terminals 39 in the anode potential supply circuit of the two tubes 21 and 22. The terminating network used for an actual converter of this type need not, therefore, always have an inductance as one of its shunt elements. There is a transformer 14 on the other side of the converter, but the transformer inductance is higher than the inductance of coil 28. As a result, coil 28 produces shunting action at low frequencies at the "network" terminals of the converter. The networks shown in Figs. 4C and 4D differ from those shown in Figs. 4A and 4B for use with an ideal converter for this reason. When the networks of Figs. 4C and 4D are used to terminate the converter shown in Fig. 2, coil 28 serves to provide a substantial terminating short-circuit (i. e., a relatively low impedance) at frequencies below the signal band, while condenser 71 in the network proper serves to produce substantially a short-circuit at frequencies above the band. In the broader sense, however, the coil 28 across the "network" terminals 39 of the Fig. 2 converter may be considered a part of the terminating network, particularly since it assists in providing the proper terminating impedance for the converter. Either or both of the terminating networks illustrated in Figs. 4C and 4D may be provided with one or more additional parallel resistance-capacitance combinations in series in the manner shown in Fig. 4B to give additional control over the shape of the high frequency and of the network impedance characteristic. The small resistance 75 in the network of Fig. 4D is provided to make up the small amount of loss encountered in the converter.

Figure 4E:
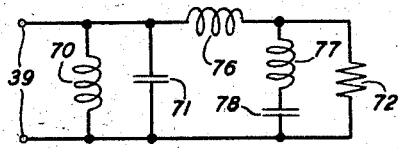

Fig. 4E illustrates a two-terminal passive impedance network suitable for terminating an ideal converter which is connected to produce a series type negative impedance for use in series with a coil-loaded transmission line. The network in Fig. 4E is the same as the one shown in Fig. 4A except that a first coil 76 is connected between one side of condenser 71 and the corresponding side of resistance 72, and the series combination of a second coil 77 and a condenser 78 is connected in shunt with resistance 72 in order to make the impedance characteristic of the network match that of the coil-loaded line within the signal band. The operation of the network in presenting substantial short-circuits (i. e., relatively low impedances) to the converter at frequencies above and below the signal band is, however, the same as for the networks described previously. Coil 70 provides an impedance many times lower than the line impedance at frequencies below the signal band, while condenser 71 provides an impedance many times lower than the line impedance at frequencies above the signal band.

Figure 4F:
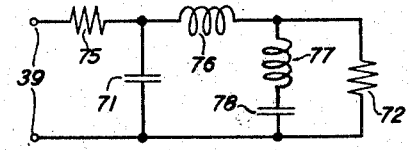

Fig. 4F shows a network that may be used for terminating the actual converter illustrated in Fig. 2 when the converter is connected to produce a series type negative impedance for use in series with a coil-loaded line. In general, the network is the same as that shown in Fig. 4E. However, for the reasons set forth in connection with Figs. 4C and 4D, the coil across the network terminals of the converter is relied upon to produce a substantial short-circuit at low frequencies and coil 70 is omitted from the network. In the broader sense, however, the terminating network may still be considered to include a coil for providing the low impedance required for stability at low frequencies. Resistance 75 may be provided to counteract converter loss in the same manner as in Fig. 4D.

The actual network shown in Fig. 4F is illustrated in Fig. 12 of the present applicant's above-identified copending application and also forms the basis for applicant's United States Patent 2,632,051, issued March 17, 1953.

For use with the converter of Fig. 2 arranged to produce a negative impedance of the series type in series with a non-loaded transmission line having a signal frequency band of from approximately 200 cycles per second to approximately 3500 cycles per second, the following values for the circuit elements in Fig. 4D are given by way of example:

Capacitance 71 _____ microfarads__ 0.0145
Resistance 72 _____ ohms__ 5900
Resistance 75 _____ do____ 2500

For use with the same converter arranged to produce a series type negative impedance in series with a coil-loaded line having a signal frequency band of from approximately 200 cycles per second to approximately 3500 cycles per second, the following values for the circuit elements in Fig. 4F are given by way of example:

Capacitance 71 _____ microfarads__ 0.0095
Resistance 72 _____ ohms__ 5065
Resistance 75 _____ do____ 1342
Inductance 76 _____ henrys__ 0.352
Inductance 77 _____ do____ 0.30
Capacitance 78 _____ microfarads__ 0.0044

Figure 5A:
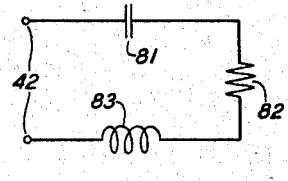
Figs. 5A through 5E illustrate terminating circuits which, in accordance with another feature of the invention, may be used to stabilize the converter of Fig. 3 against self-oscillation outside of the signal frequency band.

A two-terminal passive impedance network suitable for terminating an ideal four-terminal negative impedance converter connected to produce a shunt type negative impedance in shunt across a non-loaded transmission line is illustrated schematically in Fig. 5A. There, a capacitance 81, a resistance 82, and an inductance 83 are shown connected in series with each other between the network terminals, which are labelled 42 to correspond with the "network" terminals 42 of the negative impedance converter in Fig. 3.

In accordance with a feature of the present invention, the terminating network shown in Fig. 5A presents to terminals 42 an impedance which is many times higher than the line impedance at frequencies outside of the signal band. Capacitance 81 provides substantially an open-circuit at low frequencies, while inductance 83 provides substantially an open-circuit at high frequencies. As seen from its "network" terminals, the converter of Fig. 3 is open-circuit stable. The network shown in Fig. 5A, therefore, prevents the converter from generating self-oscillations outside of the signal band. Within the signal band, stability is controlled by the impedance presented to the other end of the converter by the transmission line.

Figure 5B:
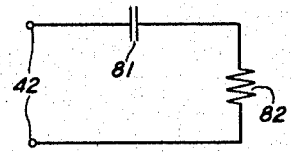

While Fig. 5A represents a network suitable for use in terminating an ideal converter, it also represents, along with Fig. 5B, a network that may be used for terminating the actual negative impedance converter illustrated in Fig. 3 when the converter is connected to produce a negative impedance of the shunt type in shunt across a non-loaded transmission line. The network of Fig. 5B is the same as that illustrated in Fig. 5A except that inductance 83 is omitted.

Inductance 83 may be omitted from the terminating network for the actual four-terminal negative impedance converter shown in Fig. 3 in many instances for the reason that, in general, the impedance of a non-loaded transmission line tends to become relatively low at high frequencies and can, above the signal band, approximate a small resistance. In addition to being open-circuit stable, as seen from the network, the converter of Fig. 3 is short-circuit stable, as seen from the line. The converter can be stabilized against singing at either end, namely, by connecting substantially a short-circuit (i. e., a relative low resistance) across the line terminals or by providing substantially an open-circuit (i. e., a relatively high resistance) between the network terminals. If, therefore, the converter of Fig. 3 is connected to provide a shunt type negative impedance in shunt across a non-loaded transmission line and the transmission line presents the correct impedance to the converter to stabilize it against self-oscillation at frequencies in and above the signal band, the terminating network need provide primary stabilization only at frequencies below the signal band. The two-terminal network illustrated in Fig. 5B is such a terminating network. A margin of stability at frequencies within and above the signal band is provided, however, by making resistance 82 large in comparison with the line impedance.

If the impedance presented to the "line" terminals of the converter is not sufficiently low at frequencies above the signal band to assure stability, it is generally desirable to use the terminating network of Fig. 5A in connection with non-loaded lines.

Figure 5C:
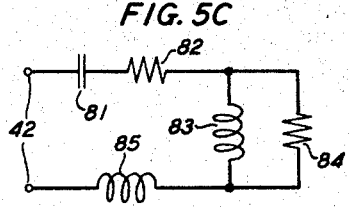

Fig. 5C shows a two-terminal passive impedance network suitable for terminating an ideal four-terminal negative impedance converter when the converter is connected to produce a shunt type negative impedance in shunt across a coil-loaded transmission line. The network in Fig. 5C is substantially the same as the one shown in Fig. 5A except that a resistance 84 is connected in parallel with inductance 83 and an additional inductance 85 is connected in the series path between terminals 42. The additional elements provide the desired impedance characteristics within the signal frequency band. The operation of the network in presenting substantial open-circuits to the converter at frequencies above and below the signal band is, however, the same as for the networks described above. Condenser 81 provides an impedance many times greater than the line impedance at frequencies below the signal band, while inductance 83 provides an impedance many times greater than the line impedance at frequencies above the signal band.

Figure 5D:
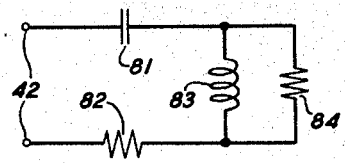
Figure 5E:
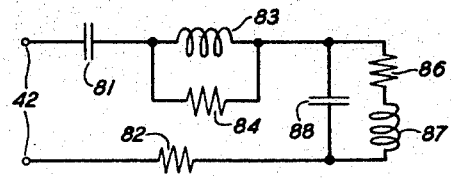

Figs. 5C, 5D, and 5E all illustrate networks that may be used for terminating the actual converter of Fig. 3 when the converter is connected to produce a negative impedance of the shunt type in shunt across a coil-loaded transmission line. Fig. 5C, it will be noted, shows a network suitable for terminating either ideal or actual converters. In general, the networks of Figs. 5D and 5E are the same as that shown in Fig. 5C. Various impedance elements are either added to or subtracted from the basic configuration of Fig. 5C, however, in order to realize a desired impedance characteristic within the signal band. Fig. 5D is the same as Fig. 5C except that inductance 85 is omitted, while Fig. 5E is the same as Fig. 5D except that a resistance 86 and an inductance 87 are added in series in the path between terminals 42 and the series combination of resistance 86 and inductance 87 is shunted by a capacitor 88.

For use with the converter of Fig. 3 arranged to produce a negative impedance of the shunt type in shunt across a non-loaded transmission line having a signal frequency band of from approximately 200 cycles per second to approximately 3500 cycles per second, the following values for the circuit elements in Figs. 5A and 5B are given by way of example:

Capacitance 81 _____ microfarads __ 0.2
Resistance 82 _____ ohms __ 120
Inductance 83 _____ henrys __ 0.01

For use with the same converter arranged to produce a negative impedance of the shunt type in shunt across a coil-loaded line having a signal frequency band of from approximately 200 cycles per second to approximately 3500 cycles per second, the following values for the circuit elements in Fig. 5E are given by way of example:

Capacitance 81 _____ microfarads __ 0.3
Resistance 82 _____ ohms __ 1834
Inductance 83 _____ henrys __ 0.04
Resistance 84 _____ ohms __ 549
Resistance 86 _____ do ____ 28
Inductance 87 _____ henrys __ 0.03
Capacitance 88 _____ microfarads __ 0.064

Figure 6:
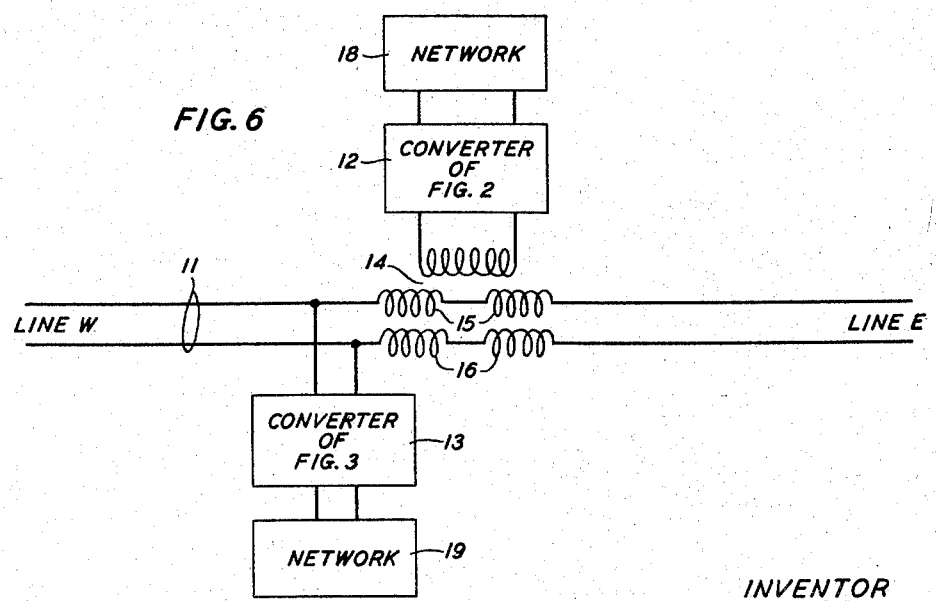
Fig. 6 is a block diagram of an L-type negative impedance repeater embodying the present invention.

The embodiment of the invention illustrated in Fig. 6 is an L-type negative impedance repeater in which a negative impedance of the series type is coupled in series with the line and a negative impedance of the shunt type is connected in shunt across the line. It is the same as the T-type repeater shown in Fig. 1, except that, instead of being connected to the mid-points of line windings 15 and 16, the "line" terminals of converter 13 are coupled to opposite sides of line 11 adjacent to corresponding ends of windings 15 and 16. This repeater is like the embodiment of the invention shown in Fig. 1 in that it provides an increase in gain beyond that available through the use of only a single negative impedance converter without having any adverse effect upon the stability of the line. The present invention permits the repeater to be stabilized against converter self-oscillation and keeps it free of the possible difficulties that such singing would entail.

A principal operating difference between the embodiment of the invention of Fig. 6 and that of Fig. 1 is that the former effects an impedance transformation. The image impedance of the L-type repeater seen from line E of Fig. 6 is higher than the image impedance of the repeater seen from line W. The repeater is, therefore, particularly useful in coupling together two transmission lines which have different image impedances and in effecting a gain at the same time. When, for example, it is desired to couple a coil-loaded line to a non-loaded line, the coil-loaded line is coupled to the right-hand side of the repeater in Fig. 6 and the non-loaded line is coupled to the left-hand side. The impedance of the coil-loaded line is higher than that of the non-loaded line, so that the coil-loaded line is connected to the series arm and the non-loaded line is connected to the shunt arm of the L-type repeater.

It is to be understood that the above-described arrangements are illustrative of the application of the principles of the invention. Numerous other arrangements may be devised by those skilled in the art without departing from the spirit and scope of the invention.

What is claimed is:

1. In combination, a two-wire transmission line having a predetermined frequency band of signal transmission, a first four-terminal negative impedance converter having a first pair of terminals and a second pair of terminals, said first converter being oriented to produce a negative impedance of the series type between said first pair of terminals and said first pair of terminals being connected substantially in series with said transmission line, a second four-terminal negative impedance converter having a third pair of terminals and a fourth pair of terminals, said second converter being oriented to produce a negative impedance of the shunt type between said third pair of terminals and said third pair of terminals being connected substantially in shunt across said transmission line, a first two-terminal network connected between said second pair of terminals presenting substantially a short-circuit to said first converter at frequencies outside of said band and a second two-terminal network connected between said fourth pair of terminals presenting substantially an open circuit to said second converter at frequencies outside of said band, whereby both of said converters are stabilized against self-oscillation at frequencies outside of said band while permitting the attenuation of said transmission line within said band to be reduced.

2. In combination, a two-wire transmission line having a predetermined frequency band of signal transmission, a first four-terminal negative impedance converter having a first pair of terminals and a second pair of terminals, said first converter being oriented to produce a negative impedance of the series type between said first pair of terminals, a transformer having at least a first winding and a second winding, said first winding being connected between said first pair of terminals and said second winding being connected in series with one side of said transmission line, a second four-terminal negative impedance converter having a third pair of terminals and a fourth pair of terminals, said second converter being oriented to produce a negative impedance of the shunt type between said third pair of terminals and said third pair of terminals being connected substantially in shunt across said transmission line, a first two-terminal network connected between said second pair of terminals presenting substantially a short-circuit to said first converter at frequencies above and below said band and a second two-terminal network connected between said fourth pair of terminals presenting substantially an open circuit to said second converter at frequencies above and below said band, whereby both of said converters are stabilized against self-oscillation at frequencies outside of said band while permitting the attenuation of said transmission line within said band to be reduced.

3. In combination, a two-wire transmission line having a predetermined frequency band of signal transmission, a first four-terminal negative impedance converter having a first pair of terminals and a second pair of terminals, said first converter being oriented to produce a negative impedance of the series type between said first pair of terminals, a transformer having at least a first winding and a second winding, said first winding being connected between said first pair of terminals and said second winding being connected in series with one side of said transmission line, a second four-terminal negative impedance converter having a third pair of terminals and a fourth pair of terminals, said second converter being oriented to produce a negative impedance of the shunt type between said third pair of terminals and said third pair of terminals being connected substantially in shunt across said transmission line between an intermediate point of said second winding and the other side of said transmission line, a first two-terminal network connected between said second pair of terminals presenting substantially a short-circuit to said first converter at frequencies above and below said band and a second two-terminal network connected between said fourth pair of terminals presenting substantially an open circuit to said second converter at frequencies above and below said band, whereby both of said converters are stabilized against self-oscillation at frequencies outside of said band while permitting the attenuation of said transmission line within said band to be reduced.

4. In combination, a two-wire transmission line having a predetermined frequency band of signal transmission, a first four-terminal negative impedance converter having a first pair of terminals and a second pair of terminals, said first converter being oriented to produce a negative impedance of the series type between said first pair of terminals a transformer having at least a first winding and a second winding, said first winding being connected between said first pair of terminals and said second winding being connected in series with one side of said transmission line, a second four-terminal negative impedance converter having a third pair of terminals and a fourth pair of terminals, said second converter being oriented to produce a negative impedance of the shunt type between said third pair of terminals and said third pair of terminals being connected substantially in shunt across said transmission line between one end of said second winding and the other side of said transmission line, a first two-terminal network connected between said second pair of terminals presenting substantially a short-circuit to said first converter at frequencies above and below said band and a second two-terminal network connected between said fourth pair of terminals presenting substantially an open circuit to said second converter at frequencies above and below said band, whereby both of said converters are stabilized against self-oscillation at frequencies outside of said band while permitting the attenuation of said transmission line within said band to be reduced and the impedance presented to said line by said converters is higher at the end of said second winding remote from said second converter than at the end nearest said second converter.

5. In combination, a two-wire transmission line having a predetermined frequency band of signal transmission, a first four-terminal negative impedance converter having a first pair of terminals and a second pair of terminals, said first converter being oriented to produce a negative impedance of the series type between said first pair of terminals and said first pair of terminals being connected substantially in series with said transmission line, a second four-terminal negative impedance converter having a third pair of terminals and a fourth pair of terminals, said second converter being oriented to produce a negative impedance of the shunt type between said third pair of terminals and said third pair of terminals being connected substantially in shunt across said transmission line, a first two-terminal network connected between said second pair of terminals presenting an impedance many times less than the impedance of said transmission line to said first converter at frequencies outside of said band, and a second two-terminal network connected between said fourth pair of terminals presenting an impedance many times greater than the impedance of said transmission line to said second converter at frequencies outside of said band, whereby both of said converters are stabilized against self-oscillation at frequencies outside of said band and the impedances of said networks within said band are such as to reduce the attenuation of said transmission line within said band.

6. In combination, a two-wire transmission line having a predetermined frequency band of signal transmission, a first four-terminal negative impedance converter having a first pair of terminals and a second pair of terminals, said first converter being oriented to produce a negative impedance of the series type between said first pair of terminals and said first pair of terminals being connected substantially in series with said transmission line, a second four-terminal negative impedance converter having a third pair of terminals and a fourth pair of terminals, said second converter being oriented to produce a negative impedance of the shunt type between said third pair of terminals and said third pair of terminals being connected substantially in shunt across said transmission line, a first two-terminal network connected between said second pair of terminals presenting substantially a short-circuit to said first converter at frequencies above and below said band, said first network comprising a resistance, an inductance, and a capacitance connected substantially in parallel across said second pair of terminals and second two-terminal network connected between said fourth pair of terminals presenting substantially an open circuit to said second converter at frequencies above and below said band, said second network comprising a resistance, an inductance, and a capacitance connected in series between said fourth pair of terminals, whereby both of said converters are stabilized against self-oscillation at frequencies outside of said band and the attenuation of said transmission line within said band may be reduced.

7. In combination, a two-wire transmission line having a predetermined frequency band of signal transmission, a first four-terminal negative impedance converter having a first pair of terminals and a second pair of terminals, said first converter being oriented to produce a negative impedance of the series type between said first pair of terminals, a transformer having at least a first winding and a second winding, said first winding being connected between said first pair of terminals and said second winding being connected in series with one side of said transmission line, a second four-terminal negative impedance converter having a third pair of terminals and a fourth pair of terminals, said second converter being oriented to produce a negative impedance of the shunt type between said third pair of terminals and said third pair of terminals being connected substantially in shunt across said transmission line, a first two-terminal network connected between said second pair of terminals presenting substantially a short-circuit to said first converter at frequencies above and below said band, said first network comprising a resistance, an inductance, and a capacitance connected substantially in parallel across said second pair of terminals and a second two-terminal network connected between said fourth pair of terminals presenting substantially an open circuit to said second converter at frequencies above and below said band, said second network comprising a resistance, an inductance, and a capacitance connected in series between said fourth pair of terminals, whereby both of said converters are stabilized against self-oscillation at frequencies outside of said band and the attenuation of said transmission line within said band may be reduced.

8. In combination, a two-wire transmission line having a predetermined frequency band of signal transmission, a four-terminal negative impedance converter having a first pair of terminals and a second pair of terminals, said converter being oriented to produce a negative impedance of the shunt type between said first pair of terminals and said first pair of terminals being connected substantially in shunt across said transmission line, and a two-terminal network connected between said second pair of terminals presenting an impedance substantially matching the impedance of said transmission line to said converter at frequencies within said band and presenting substantially an open circuit to said converter at frequencies outside of said band, whereby said converter is stabilized against self-oscillation at frequencies outside of said band and the attenuation of said line within said band is reduced.

9. In combination, a two-wire transmission line having a predetermined frequency band of signal transmission, a four-terminal negative impedance converter having a first pair of terminals and a second pair of terminals, said converter being oriented to produce a negative impedance of the shunt type between said first pair of terminals and said first pair of terminals being connected substantially in shunt across said transmission line, and a two-terminal network connected between said second pair of terminals presenting an impedance substantially matching the impedance of said transmission line to said converter at frequencies within said band and presenting an impedance many times greater than the impedance of said transmission line to said converter at frequencies outside of said band, whereby said converter is stabilized against self-oscillation at frequencies outside of said band while permitting the attenuation of said line within said band to be reduced.

10. In combination, a two-wire transmission line having a predetermined frequency band of signal transmission, a four-terminal negative impedance converter having a first pair of terminals and a second pair of terminals, said converter being oriented to produce a negative impedance of the shunt type between said first pair of terminals and said first pair of terminals being connected substantially in shunt across said transmission line, and a two-terminal network connected between said second pair of terminals presenting substantially an open circuit to said converter at frequencies above and below said band, said network comprising a resistance, an inductance, and a capacitance connected in series between said second pair of terminals, whereby said converter is stabilized against self-oscillation at frequencies outside of said band while permitting the attenuation of said line within said band to be reduced.

References Cited in the file of this patent
UNITED STATES PATENTS

| | | |
|---|---|---|
| 1,725,154 | Marsteller | Aug. 20, 1929 |
| 1,772,506 | Affel | Aug. 12, 1930 |
| 1,900,045 | Crisson | Mar. 7, 1933 |
| 1,937,641 | Crisson | Dec. 5, 1933 |
| 1,955,681 | Mouradian | Apr. 17, 1934 |
| 2,356,867 | Meyers | Aug. 29, 1944 |
| 2,720,627 | Llewellyn | Oct. 11, 1955 |
| 2,742,616 | Merrill | Apr. 17, 1956 |